A. CUMMINGS.

WOOD-SCREW.

No. 6,730.

Reissued Nov. 9, 1875.

Witnesses;

F. H. Galpin

J. M. Galpin

Inventor;

Allan Cummings,

By A. L. Mynderse,

Attorney.

UNITED STATES PATENT OFFICE.

ALLAN CUMMINGS, OF NEW YORK, N. Y., ASSIGNOR TO THE NEW YORK SCREW COMPANY, OF SAME PLACE.

IMPROVEMENT IN WOOD-SCREWS.

Specification forming part of Letters Patent No. 161,390, dated March 30, 1875; reissue No. 6,730, dated November 9, 1875; application filed August 4, 1875.

DIVISION B.

*To all whom it may concern:*

Be it known that I, ALLAN CUMMINGS, of the city, county, and State of New York, have invented an Improvement in Screws, of which the following is a specification:

The object of my invention is to provide a screw of any and all varieties, so constructed that they may be readily inserted and driven home, or withdrawn, when desired, with great rapidity and safety, without the slightest danger of injuring the head of the screw, or the work into which the screw is being driven, by the reason of the slipping of the screw-driver from the slot or nick in the head of the screw.

In order to fully and satisfactorily accomplish this object, I form in the center of the head of a screw, in addition to the usual slot or nick, a deep cavity or hole, of suitable shape, into which cavity and slot a properly-shaped screw-driver or tool is inserted, and furnishes the leverage for driving or withdrawing the screw. The form of this driving-tool is that of an ordinary screw-driver, the blade of which, at the base, is provided with a projecting spur, coinciding in shape with the cavity in the head of the screw, so that it will fit both the slot or nick and cavity at the same time, thus giving great strength and vastly increased power.

In carrying out my invention I have made this cavity, in the center of the screw-head, angular in shape, this form being the best adapted for the purpose by reason of its furnishing the greater amount of increased power, as well as for the additional reason that it is the most readily formed in the screw-head. Any angular-shaped cavity other than square will fully answer the purposes of my invention.

In the following description I have carefully pointed out and described the various modes and forms to which my improvement may be applied and adapted.

Figure 1:
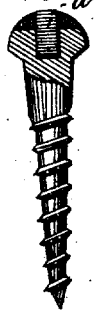
Figure 2:
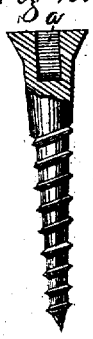
Figure 4:
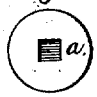
Figure 3:
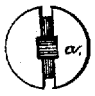
Figure 5:
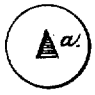

In the drawings, which form a part of this specification, Figure 1 is an elevation, partially in section, of an ordinary wood-screw, the rounded head of which is provided with a deep angular cavity, in addition to the usual slot, in accordance with my invention. Fig. 2 shows my improvement as applied to an ordinary screw, the usual slot being omitted. Fig. 3 is a plan view of an ordinary screw, in the head of which the cavity is shown as square in shape, and combined with the usual slot. Fig. 4 is a plan view of the head of the screw illustrated by Fig. 2. Fig. 5 is a modification, in which the cavity is shown as triangular in shape.

Similar letters of reference will indicate corresponding parts.

It is a well-known and fully-established fact that the ordinary screw-head, which is provided only with a narrow, shallow slot or nick milled across its face, in which slot the screw-driver is applied, is very susceptible to injury, caused mainly by the frequent slipping of the screw-driver from the slot or nick when the screw is being "set home" in either wood or metal, or being withdrawn from the same. It is also not an unusual occurrence to have one-half of the screw-head split off whenever an extra amount of power is applied through the ordinary screw-driver. These mishaps are so common as to be notorious among the manufacturers and mechanics who use large numbers of screws, and the loss resulting from such damaged screws annually amounts to large sums of money.

It is to entirely obviate all of these difficulties, to gain additional strength in the screw-head, and an increased driving-power, also to render it absolutely impossible to injure the screw-head in any manner, that I have made my present invention.

Large quantities of what are known as "capped screws" for ornamental purposes are now made, and extensively used in fitting and finishing up the interior of cars, stages, coaches, in furniture, billiard-tables, pianos, and for other similar purposes. The heads of these screws, either flat or rounded, are covered with a thin metallic cap, which is plated with gold, silver, or nickel, as may be desired. In the process of capping, the plate is cut away from that portion of the head of the screw in which the slot or nick is formed. This metallic cap or cover being very thin, the utmost nicety in the use of these capped screws is called for. In driving them with the ordinary screw-driver, it is very common for the driver to slip from the slot or nick, tearing up the cap, and thus spoiling its appearance, and necessitating its being thrown aside.

It will be readily seen that by combining with the usual slot or nick in this class of screws a cavity of angular shape formed in the center of the screw-head, and using as the driving-tool a screw-driver provided with an angular projecting spur, so that it will fit the cavity and slot at the same time, perfect safety is insured to the metallic cap as well as to the screw-head itself. Perfect work also is thus insured, and no loss of screws absolutely guaranteed. The process of capping is also simplified.

Large quantities of soft-metal screws in brass or similar composition metals are also much used, and the same difficulties are met with. In such classes of screws all trouble is obviated by my improvement.

It is in the removal or withdrawing of screws that my invention, combined with the improved form of screw-driver, proves its great utility and advantages.

Screws that have been long embedded and rusted in are difficult to remove with an ordinary screw-driver, as it will invariably slip from the slot, repeating the same until it is utterly impossible to start the screw from its bed, or to obtain any hold in the then damaged slot or nick. The screw has then to be removed by cutting it out, to the great damage of the work in which it was located. My improvement completely eradicates all this trouble, as a screw having a cavity in its head is readily and surely withdrawn at the first attempt.

In Fig. 1, *a* represents a deep angular cavity or hole formed in the center of the head of an ordinary round-headed wood-screw, and in Fig. 2 *a* represents the same angular cavity formed in a flat-headed wood-screw, which screws, in both instances, are also provided with the usual slot or nick, and may also either be capped or not. The slot or nick is of the usual size, no change in that respect being called for in the addition of my improvement. The cavity or hole *a* is formed of such shape and depth as may in practice be found to be best adapted to fully accomplish the purposes of my invention. It may be made usually the same size from top to bottom, or, if preferred, made tapering.

In Fig. 4, which is a plan view of the head of the screw shown in Fig. 2, the cavity *a* is shown as square in shape. This shape seems to be the best adapted for the purpose; but other angular forms may be used, as shown in Fig. 5, in which a triangular-shaped cavity is given.

It is obvious that any one of these or other angular shapes will answer. I therefore do not confine or limit myself to any designated one of them.

These cavities may be formed in the screw-head by proper tools attached to the screw-machine, at the same time the screw is being formed, or they may be made in a distinct machine, as a separate process from the formation of the screw itself. These operations are well-known mechanical processes, and, as they form no part of my present invention, require no detailed description herewith.

It is obvious that my improvement is readily applied to all of the known forms of screws, both machine and wood.

Having thus fully described my invention, what I claim as new, and desire to secure by Letters Patent, is—

A screw the head of which, at its center, is provided with an angular cavity, in addition to the usual slot or nick, substantially as and for the purposes as herein shown and described.

ALLAN CUMMINGS.

Signed in presence of—
A. L. MUNSON,
R. I. GRIFFITH.